United States Patent
Champion et al.

(10) Patent No.: US 11,612,932 B2
(45) Date of Patent: Mar. 28, 2023

(54) OPERATING A SINTERING FURNACE

(71) Applicant: Hewlett-Packard Development Company, L.P., Spring, TX (US)

(72) Inventors: David Champion, Corvallis, OR (US); Richard Seaver, Corvallis, OR (US); Pavan Suri, Corvallis, OR (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 324 days.

(21) Appl. No.: 17/058,585

(22) PCT Filed: Nov. 26, 2018

(86) PCT No.: PCT/US2018/062500
§ 371 (c)(1),
(2) Date: Nov. 24, 2020

(87) PCT Pub. No.: WO2020/112084
PCT Pub. Date: Jun. 4, 2020

(65) Prior Publication Data
US 2021/0121954 A1    Apr. 29, 2021

(51) Int. Cl.
*B22F 3/10*    (2006.01)
*B33Y 40/20*    (2020.01)
(Continued)

(52) U.S. Cl.
CPC ............ *B22F 3/1028* (2013.01); *B22F 3/003* (2013.01); *B22F 3/10* (2013.01); *B22F 3/1021* (2013.01);
(Continued)

(58) Field of Classification Search
CPC .......... B22F 3/1028; B22F 3/003; B22F 3/10; B22F 3/1021; B22F 10/64; B22F 10/85;
(Continued)

(56) References Cited

U.S. PATENT DOCUMENTS

| 4,719,073 A | 1/1988 | Langan |
| 4,781,358 A | 11/1988 | Langan |

(Continued)

FOREIGN PATENT DOCUMENTS

WO    WO0174518 A3    2/2002

OTHER PUBLICATIONS

Guan, G. et al "Loose powder detection and surface characterization in selective laser sintering via optical coherence tomography" Proc Math Phys Eng Sci 2016, 472(2191) 18pgs.

*Primary Examiner* — Rebecca Janssen
(74) *Attorney, Agent, or Firm* — Shook, Hardy & Bacon L.L.P.

(57) ABSTRACT

In an example implementation, a method of operating a sintering furnace includes receiving information about a green object load to be sintered in a sintering furnace, determining a sintering profile based on the information, and performing a sintering process according to the sintering profile. During the sintering process, a sensor reading that indicates a degree of densification of a green object in the load is accessed from a densification sensor. The method includes initiating a cool down phase of the sintering process if the sensor reading has reached a target sensor reading.

15 Claims, 6 Drawing Sheets

(51) Int. Cl.
  *B22F 10/64* (2021.01)
  *B22F 3/00* (2021.01)
  *F27D 19/00* (2006.01)
  *B33Y 10/00* (2015.01)
  *B33Y 50/02* (2015.01)
  *B22F 10/85* (2021.01)
  *G01N 9/00* (2006.01)
  *B22F 10/14* (2021.01)
  *B22F 3/22* (2006.01)

(52) U.S. Cl.
  CPC .............. *B22F 10/64* (2021.01); *B22F 10/85* (2021.01); *B33Y 40/20* (2020.01); *B33Y 50/02* (2014.12); *F27D 19/00* (2013.01); *G01N 9/00* (2013.01); *B22F 3/225* (2013.01); *B22F 10/14* (2021.01); *B33Y 10/00* (2014.12); *F27D 2019/0003* (2013.01); *F27D 2019/0028* (2013.01)

(58) Field of Classification Search
  CPC .......... B22F 3/225; B22F 10/14; B33Y 40/20; B33Y 50/02; B33Y 10/00; F27D 19/00; F27D 2019/0003; F27D 2019/0028; G01N 9/00; Y02P 10/25; F27B 5/04; F27B 5/18
  See application file for complete search history.

(56) References Cited

U.S. PATENT DOCUMENTS

| | | |
|---|---|---|
| 6,930,278 B1 | 8/2005 | Chung et al. |
| 2014/0314613 A1 | 10/2014 | Hopkinson et al. |
| 2017/0130287 A1 | 5/2017 | Takahashi et al. |
| 2017/0144223 A1 | 5/2017 | Gold et al. |
| 2018/0314216 A1* | 11/2018 | Tuncer .................. B33Y 40/00 |

* cited by examiner

OPERATING A SINTERING FURNACE

BACKGROUND

Powder metal manufacturing processes such as MIM (metal injection molding) and binder jetting produce metal objects from powdered metal materials. Such processes include preparing "green objects" that comprise a powdered metal and a binder. The binder material can be removed from a green object during a binder burnout phase of a sintering process, and the powdered metal can then be consolidated and densified in the sintering process to improve the strength and integrity of the object. Sintering processes, such as pressurized sintering and atmospheric (pressureless) sintering, expose green objects to high temperatures for predetermined periods of time to bond the powdered metal particles together. During the sintering process, objects are brought up to an appropriate sintering temperature that is below the melting point of the metal powder, and the objects are maintained at the sintering temperature according to a predetermined time-temperature profile.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
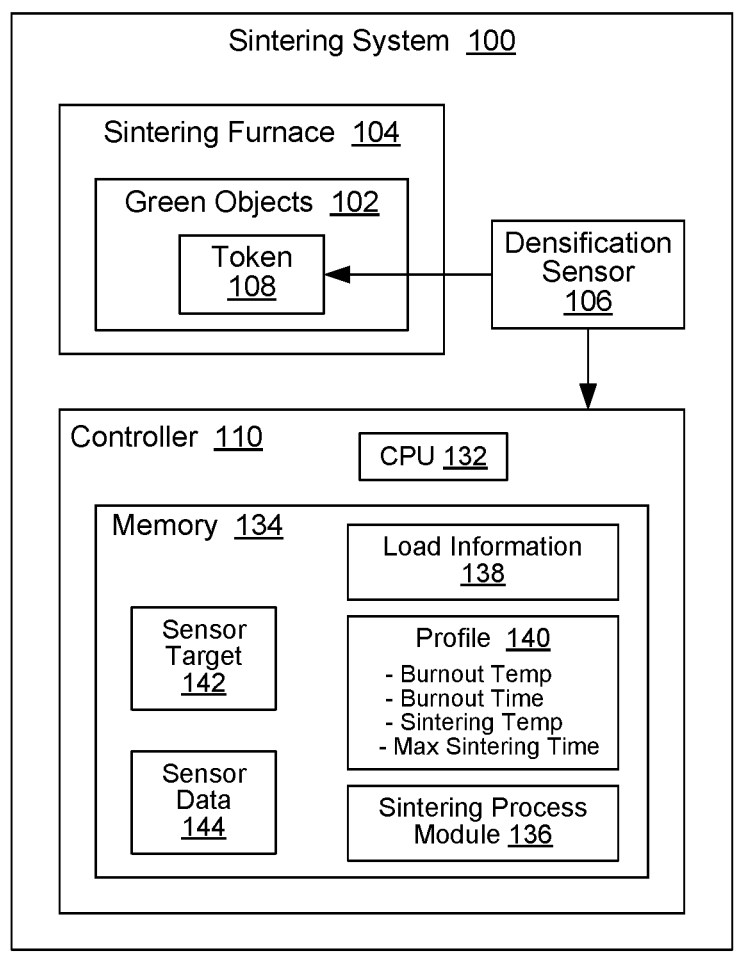
FIG. 1 shows a block diagram of an example sintering system.

Sintering is a heat treatment process often used to improve mechanical and other properties of "green" state objects or parts produced by different manufacturing methods such as binder jet 3D printing and MIM (metal injection molding) processes. A green object is an object whose material is in a weakly bound state, such as weakly bonded powder material before it has been sintered or fired. Sintering processes expose "green" objects to high temperatures for predetermined periods of time. Time-temperature profiles for sintering processes are generally determined based on experimentation with properties including the material type, material density, wall thickness, and total mass and general thermal load of the green objects to be sintered. Such profiles are designed to control the heating and cooling cycles of the sintering process so that the green objects within a furnace load are exposed to the proper sintering temperature for the correct amount of time that will bring the objects to a sintering endpoint or completion. However, determining such time-temperature profiles can be costly due to, for example, variations in thermal properties of different materials, variations in total thermal mass between different sintering runs, the matching of thermocouples to the process gas being used, and so on. In addition, the time-temperature profiles merely provide an indirect method for estimating when a sintering endpoint will be reached. Therefore, controlling sintering cycles based on predetermined time-temperature profiles can result in suboptimal quality among the sintered objects within a given sintering furnace load.

In some examples, a sintering furnace can be loaded with green objects and programmed with a particular time-temperature profile to control the heating and cooling cycle of the furnace. The time-temperature profile for a given furnace load is generally determined through trial and error based on the expected thermal load of the green objects to be sintered, which considers the mass of the load as well as the dimensional and material characteristics of the objects, as noted above. However, a furnace load can include green objects with varying characteristics, such as objects that have different thermal loads and/or different sizes, shapes, and thicknesses. In some 3D printing processes, such as binder jetting, for example, there can be a significant degree of variability among the green objects that are produced within different printing batches or within the same printing batch. Therefore, the profiles for controlling sintering cycle times are often developed to accommodate the worst-case scenario. Worst-case scenarios can be determined based on green objects that are expected to have the greatest thermal loads, the thickest object sections, and/or the types of metal powder materials that call for the longest furnace sintering times.

Because sintering cycle times are usually developed to accommodate green objects that represent such worst-case scenarios, other green objects within a same furnace load are often exposed to longer sintering times that can extend well beyond their sintering endpoints. Extended sintering times can result in over-sintering of some objects and can degrade the quality and performance of the sintered objects, as well as increase the costs associated with operating the sintering furnace, including additional time, energy, and furnace wear and tear.

As noted above, during the sintering process green objects are brought up to an appropriate sintering temperature for predetermined periods of time to achieve the sintering endpoint or completion. Sintering temperatures are generally some percentage of the melting point temperature of the metal material being sintered. For example, sintering temperatures can be on the order of 70%-90% of the melting point. Measuring and monitoring furnace temperatures to ensure that the correct sintering temperature is reached and sustained at the center of the furnace "hot zone" can be challenging and costly.

The primary method for monitoring temperature in a sintering furnace involves the use of thermocouples, which can add significant cost to the sintering process. Thermocouples are application specific devices because they must be matched with the process gas and the temperatures being used for sintering the green object materials within a furnace load. In addition, thermocouples are typically located on the outside of the thermal mass cluster and are ideally routed to the center of the furnace hot zone to provide the most accurate temperature information. Furthermore, it should be noted that even when thermocouples can be used to provide accurate temperature monitoring and control over predetermined time periods, such accurate implementation of time-temperature profiles is not a definitive method for determining when a sintering endpoint has been reached. Rather, such accurate control provides at best, an indirect method for estimating when the sintering endpoint has been reached. As a result, sintering times are often extended to ensure that the worst-case objects in a furnace load reach a sintering endpoint which, as noted above, can cause over-sintering of some objects within the furnace load.

Accordingly, a sintering system and methods of controlling a sintering system described herein improve the accuracy of sintering cycle times and help prevent over-sintering of green objects. During a sintering process, the sintering system accesses a densification reading from a densification sensor and compares it with a predetermined target sensor value. The densification reading provides a measure of densification (i.e., shrinkage) that has occurred in a representative green object being sintered in a sintering furnace. The target sensor value represents a predetermined level of densification that has been experimentally determined to indicate that the sintering process for the green objects is complete. The comparison is made to determine if a sintering endpoint, or sintering completion point, has been reached for the green objects being sintered in the furnace. When a densification sensor reading reaches the target sensor value, a sintering endpoint has been reached, and the sintering system can begin a cool down phase in the furnace. When the densification sensor reading has not yet reached the target sensor value, the temperature within the furnace can be maintained at a sintering temperature for an additional sintering time, after which another densification sensor reading can be accessed and compared to the target sensor value to determine if the sintering endpoint has yet been reached. When a densification sensor reading eventually reaches the target sensor value, the sintering system can begin the furnace cool down phase.

Prior to initiating a sintering process, the sintering system requests and receives information about the furnace load of green objects to be sintered in the sintering furnace. The load information can include, for example, the total mass of the green objects in the load, the type of material in the green objects, the thickness of walls and other geometric features of the green objects, and the type and amount of binder material in the green objects. From the load information, the system determines a sintering process profile that is used to control the sintering process. The profile includes a binder burnout temperature and time, a sintering temperature, and a maximum sintering time. During a sintering process, in addition to accessing and comparing densification sensor readings with a target sensor value to initiate the furnace cool down phase, the sintering system can use the maximum sintering time to initiate the furnace cool down phase. If the furnace cool down phase is not initiated by the sensor reading comparisons, when the amount of time the sintering furnace has been maintained at the sintering temperature exceeds the maximum sintering time, the sintering system will automatically initiate the furnace cool down phase.

In a particular example, a method of operating a sintering furnace includes receiving information about a green object load to be sintered in a sintering furnace, determining a sintering profile based on the information, and performing a sintering process according to the sintering profile. During the sintering process, a sensor reading that indicates a degree of densification of a green object in the load is accessed from a densification sensor. The method includes initiating a cool down phase of the sintering process if the sensor reading has reached a target sensor reading.

In another example, a sintering system for operating a sintering furnace, includes a sintering furnace to sinter a load of green objects. The system includes a densification sensor to provide a sensor reading that indicates a degree of densification of a token green object being sintered in the sintering furnace. A controller in the system is to compare the sensor reading with a target sensor value and to initiate a furnace cool down phase when the sensor reading reaches the target sensor value.

In another example, a method of operating a sintering furnace includes, during a sintering process to sinter green objects in a sintering furnace, and after the sintering furnace has reached a sintering temperature, accessing sensor data from a densification sensor that indicates a degree of densification of a token green object. The method includes starting a furnace cool down phase if the sensor data has reached a preset target, and if the sensor data has not reached a preset target, starting the furnace cool down phase if the sintering furnace has been at the sintering temperature for a time period that exceeds a maximum sintering time.

FIG. 1 shows a block diagram of an example sintering system 100 controllable to provide accurate sintering cycle times by determining when green objects 102 being sintered in a sintering furnace 104 have reached a sintering endpoint. The sintering system 100 includes a controller 110 and a densification sensor 106 to provide densification readings that indicate the degree of densification (i.e., shrinkage) that a representative green object 108 has experienced during a sintering process. A representative green object 108 can include, for example, a token green object 108 that is part of a furnace load of green objects 102 to be sintered.

The densification sensor 106 can comprise any sensor, device, or combination of sensors and/or devices enabled to provide by any appropriate mechanism, a measurement, a reading, information, and/or data that indicates an amount or degree of densification (i.e., shrinkage) experienced by a token green object 108 during a sintering process within a sintering furnace 104. In different examples, a densification sensor 106 can be located outside the furnace 104 or inside the furnace, or partly inside the furnace and partly outside the furnace. A densification sensor 106 can comprise a sensor that measures densification of a token object 108 directly or indirectly. For example, a densification sensor 106 may comprise an optical sensor and/or an electrical sensor that can directly measure the degree of densification of a token object 108. In another example, a densification sensor 106 may comprise a gas flow that can be altered by a token object 108 as the object 108 densifies or shrinks during a sintering process, thus providing an indirect measure of the degree of densification of the token object 108.

Figure 2:
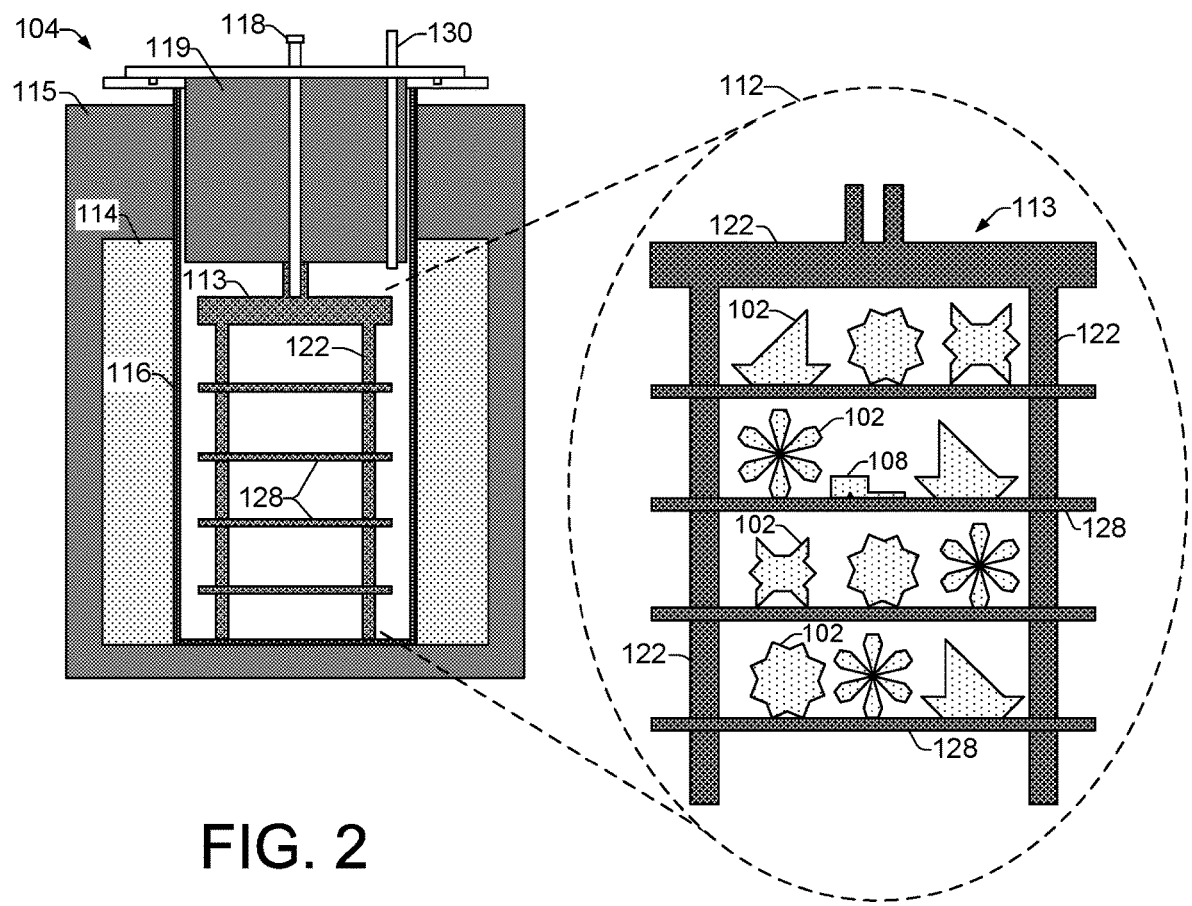
FIG. 2 shows an example of a sintering furnace with an enlarged view of an example furnace rack loaded with green objects.

The example token green object 108 comprises a sacrificial object that can be produced in the same manufacturing process batch as other green objects 102 being sintered within the same furnace load as the token object 108, as shown in FIG. 2. FIG. 2 shows an example of a sintering furnace 104 with an enlarged view 112 of an example furnace rack 113 loaded with objects that include both a token green object 108 and a number of other green objects 102 that are to be sintered in a same sintering process. The token object 108 has been produced in a same manufacturing process as the green objects 102, such as in the same 3D binder jetting process or the same MIM process. The token object 108 is therefore materially and mechanically representative of the other green objects 102. For example, both the token object 108 and green objects 102 can comprise the same type of powder metal material having the same material density and same particle sizes. In addition, both the token object 108 and green objects 102 will have had the same type and relative amount of binder material added during the manufacturing process, and both will have been exposed to the same processing steps during manufacturing. In a 3D binder jetting process, for example, both the token object 108 and other green objects 102 will undergo the same procedures such as powder layering, binder jetting, and radiation exposure using the same powder metal materials, the same binder liquid, the same binder liquid droplet sizes, the same radiation intensity, and so on.

Because the token green object 108 and green objects 102 comprise the same type of powder material with the same density and particle sizes, they behave in the same or similar manner during the sintering process. That is, during sintering, the green objects 102 undergo the same material densification and dimensional contraction as the token object 108. While the token object 108 may not be the same shape or size as the green objects 102, the token object 108 can be designed to match the average wall thickness of the green objects 102 to be sintered. Nevertheless, the sintering time of objects does not change significantly based on the relative thickness or size of the objects. Rather, the main factors that determine sintering times are the density of the object and the material type and particle size distribution of the material. The object thickness and size are of less significance in affecting sintering times because the time constants for heat transfer are smaller than the time constants for sintering. Thus, the time to heat both a small and large object, or a thin and thick object, is mostly insignificant in comparison to the time it takes the objects to begin densification during the sintering process. Therefore, the sintering time for a smaller object such as a token object 108, is very close to the sintering time for a larger object such as the green objects 102 shown in FIG. 2. Consequently, dimensional changes from densification of the token object 108 can be used to indicate corresponding changes in the green objects 102 throughout the sintering process, including indicating the point when the sintering process reaches an endpoint. As noted above, a densification sensor 106 can provide a measurement, reading, information, and/or other data that indicates an amount or degree of densification (i.e., shrinkage) experienced by a token green object 108 during a sintering process.

Referring primarily to FIG. 2, the example sintering furnace 104 is sometimes referred to as a "hot wall" design where electric heating elements 114 or other heating sources are located inside the furnace 104 between a layer of insulation 115 and the furnace retort wall 116. The retort wall 116 can be made from different materials including a refractory metal, ceramic, quartz, or other materials capable of withstanding high temperatures. Peak sintering temperatures in the furnace can depend on the type of material being sintered, with an example range of such temperatures reaching as high as between 1100° C. to 1400° C. In an example sintering process, once the green objects 102, 108 (referred to variably as the "load", "furnace load", "green object load", etc.) are loaded into the furnace on the rack 113, the controller 110 can activate the heating elements 114 to begin heating the retort 116. The retort 116 can conduct or radiate the heat to the objects within the furnace.

During a sintering process, a gas (not shown) can be introduced into the furnace atmosphere. In some examples, a sintering process includes a binder burnout phase where binder material (e.g., plastics) in the green objects 102, 108, is broken down by high temperatures, and the broken down components of the binder material are removed by the gas as it flows across the objects. The binder burnout phase can occur during the sintering process, for example, when the temperature within the furnace reaches approximately 400 to 550° C. A variety of gases can be introduced into the furnace including, for example, hydrogen, nitrogen, and carbon monoxide. Hydrogen gas is often introduced to serve as a reducing agent that helps keep the powder metal particles in the green objects 102, 108, from oxidizing and removes other contaminants. The hydrogen reduction process helps the surfaces of the metal particles remain metallic which improves the strength of bonds that are created between particles during sintering.

During a sintering process, gas can flow uniformly and continually through a gas inlet 118 and into the furnace retort 116. The gas inlet 118 can be formed in, and can pass through, the door 119 or lid of the furnace 104. In some examples, gas lines (not shown) can be routed through the frame 122 of the furnace rack 113 to gas ports in the frame 122 to enable a continual supply of gas to flow over the green objects 102, 108, positioned on the shelves 128 of the furnace rack 113. In some examples, a fan (not shown) may be provided inside the retort 116 to circulate the atmosphere. The pressure of the gas as it flows into the furnace retort 116 pushes the atmosphere within the retort 116 out of the furnace through a gas outlet 130 located in the door 119 of the furnace 104. The atmosphere being pushed out of the furnace through the outlet 130 generally comprises gas, along with different elements being carried within the gas, such as the broken down components of the binder material, and the contaminants and water vapor that are generated by a hydrogen reduction process.

As shown in FIG. 1, an example controller 110 can include a processor (CPU) 132 and a memory 134. The controller 110 may additionally include other electronics (not shown) for communicating with and controlling various components of the example sintering system 100. Such other electronics can include, for example, discrete electronic components and/or an ASIC (application specific integrated circuit). Memory 134 can include both volatile (i.e., RAM) and nonvolatile memory components (e.g., ROM, hard disk, optical disc, CD-ROM, flash memory, etc.). The components of memory 134 comprise non-transitory, machine-readable (e.g., computer/processor-readable) media that can provide for the storage of machine-readable coded program instructions, data structures, program instruction modules, and other data and/or instructions executable by a processor 132 of the sintering system 100.

As shown in the example controller 110 of FIG. 1, an example of executable instructions to be stored in memory 134 can include instructions associated with a sintering process module 136, while an example of stored data and other information can include load information 138, a sintering process profile 140, a target sensor value 142, and sensor data 144. In an example, the processor 132 can execute instructions causing the system 100 to request information about a load of green objects 102 to be loaded and sintered in the sintering furnace 104. The system 100 can receive the load information 138, which can include, for example, the total mass of the green objects in the load, the type of material in the green objects, the thickness of walls and other geometric features of the green objects, and the type and amount of binder material in the green objects. From the load information 138, the processor 132 can determine a target sensor value 142 and the sintering process profile 140 which comprises sintering process operation parameters that include a binder burnout temperature, a binder burnout time, a sintering temperature, and a maximum sintering time. The target sensor value 142 and sintering process operation parameters in profile 140 can be experimentally determined values. These and other values can be predetermined and provided, for example, in a lookup table (not shown) stored within a memory 134. Upon receipt of the load information 138, the processor 132 can determine an appropriate target sensor value 142 and the parameters for the profile 140 from such a lookup table or from some other source. The controller 110 can use these operation parameters from profile 140 to control the sintering process in the sintering furnace 104.

Figure 3:
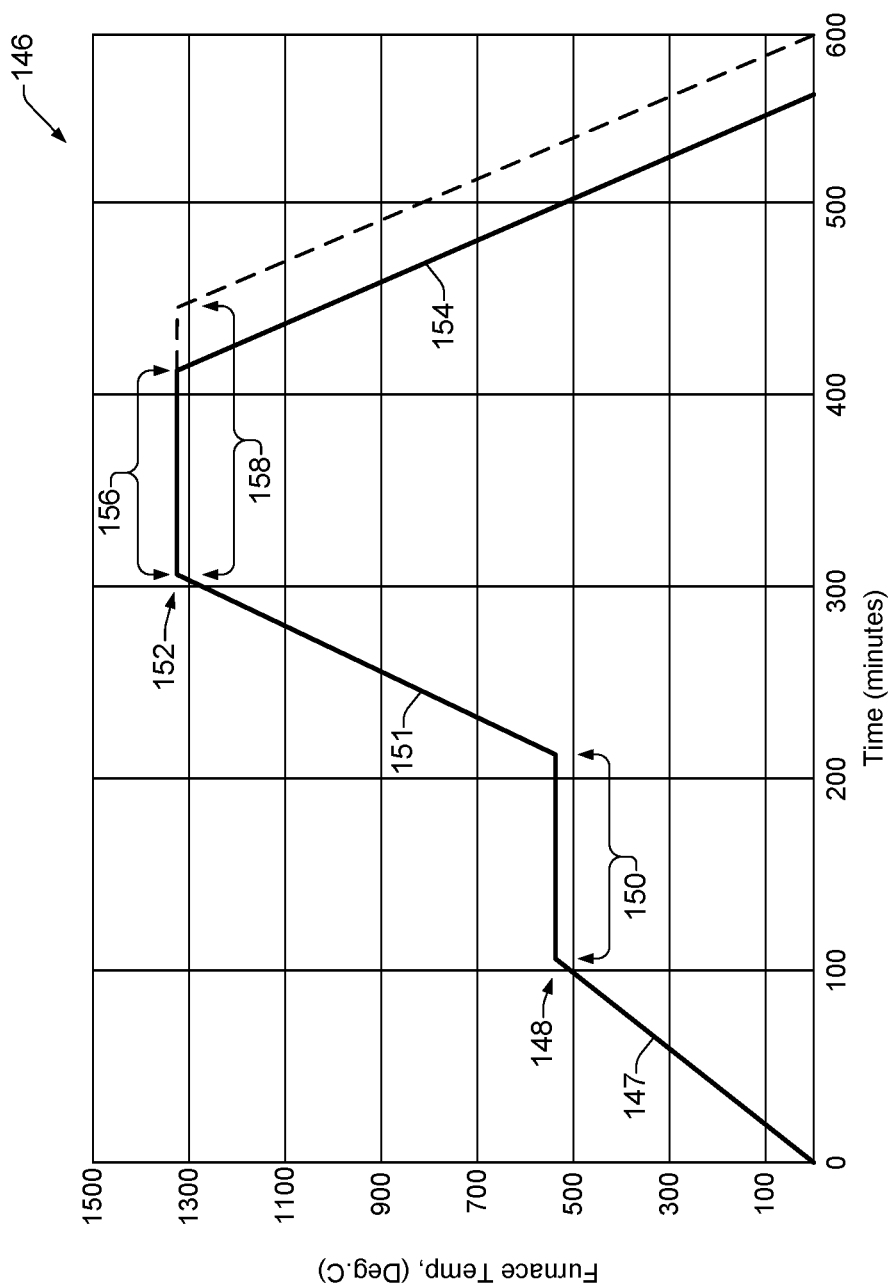
FIG. 3 shows an example of a graphical representation of a sintering process profile.

FIG. 3 shows an example of a graphical representation 146 of a sintering process profile. Upon determining parameters for the profile 140, the controller 110 continues to execute the sintering process module 136 instructions and initiates a first heating phase 147 to ramp the furnace temperature up to a binder burnout temperature 148 as called for in the profile 140. In the example shown, the binder burnout temperature is approximately 540° C. The controller 110 maintains the furnace temperature at the binder burnout temperature 148 for a binder burnout time 150 as called for in the profile 140. As shown in the sintering process graph 146, the binder burnout time 150 in this example is approximately 105 minutes. After the binder burnout time 150 has elapsed, the controller 110 initiates a second heating phase 151 by increasing the furnace temperature up to a sintering temperature 152 as called for in the profile 140. In this example, the sintering temperature 152 is approximately 1320° C., as shown in graph 146.

Once the furnace temperature reaches the sintering temperature 152, the controller 110 can access a sensor data reading 144 from the densification sensor 106 (FIG. 1) and compare the sensor data 144 with the sensor target value 142. As noted above, the sensor data 144 provides a measure of densification (i.e., shrinkage) that has occurred in the token green object 108 and the other green objects 102 being sintered in a sintering furnace 104. The target sensor value 142 represents a predetermined level of densification that has been experimentally determined to indicate that the sintering process for the green objects 102 is complete.

If the sensor data reading 144 reaches the target sensor value 142, the controller 110 can conclude that the green objects 102 in the furnace 104 have reached a sintering endpoint, and the controller 110 can begin a cool down phase 154 in the furnace 104. If the sensor data reading 144 has not yet reached the target sensor value 142, the controller 110 maintains the furnace temperature at the sintering temperature 152. After a brief delay, the controller 110 can access another sensor data reading 144 from the densification sensor 106 (FIG. 1) and compare the sensor data 144 with the sensor target value 142. This process can continue until the sensor data reading 144 reaches the target sensor value 142, and the controller 110 initiates the cool down phase 154. The amount of time the furnace remains at the sintering temperature 152 prior to initiation of the cool down phase 154 represents the sintering time 156 for the load of green objects 102. In the example shown in the sintering process graph 146, the sintering time 156 is approximately 110 minutes.

In some examples, if no sensor data reading 144 reaches the target sensor value 142 before the maximum sintering time 158 elapses, the controller 110 initiates an automatic cool down phase 160 at the end of the maximum sintering time 158, as shown in the sintering process graph 146. In the example shown in graph 146, the maximum sintering time 158 is approximately 140 minutes.

In some examples, prior to initiating a first heating phase 147, the controller 110 accesses the densification sensor 106 for a pre-process sensor reading. The pre-process sensor reading can be compared to a pre-process sensor reference to determine if the sensor reading is with an acceptable range. An acceptable sensor range can indicate that the sensor 106 is functioning properly and is able to properly measure densification of a token green object 108 during a sintering process. If the pre-process sensor reading indicates the sensor is not within an acceptable range, the controller 110 can take an action such as providing a user notification that indicates the sensor is not accurate, that the token green object 108 is not properly placed within the furnace 104, that the position of the token green object 108 should be checked prior to proceeding with the sintering process, and so on.

In some examples, during the second heating phase 151, as the furnace temperature ramps up from the binder burnout temperature 148 and the sintering temperature 152, the controller 110 can access the densification sensor 106 for a pre-sintering sensor reading. A pre-sintering sensor reading establishes a pre-sintering sensor baseline that acts as a filter to filter out any anomalies associated with the densification sensor 106. For example, where a densification sensor 106 implements gas lines to determine the densification of a token green object 108, there may be leakage between gas line coupling as the furnace temperature increases. Establishing a pre-sintering sensor baseline accounts for this leakage and enables a more accurate comparison of sensor readings to the target sensor value 142.

Figure 4:
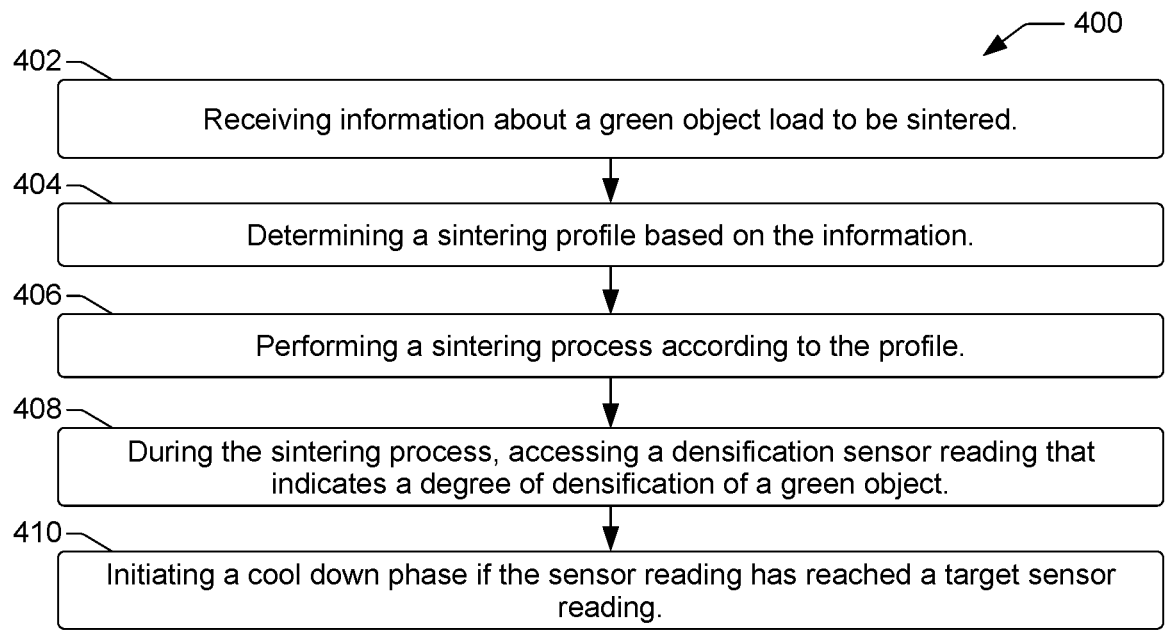
FIGS. 4, 5a, 5b, and 6 are flow diagrams showing example methods of operating a sintering furnace.

FIGS. 4, 5 (5*a*, 5*b*), and 6 are flow diagrams showing example methods 400, 500 and 600, of operating a sintering furnace. Method 500 comprises extensions of method 400 and incorporates additional details of method 400. Methods 400, 500 and 600 are associated with examples discussed above with regard to FIGS. 1-3, and details of the operations shown in methods 400, 500 and 600 can be found in the related discussion of such examples. The operations of methods 400, 500 and 600 may be embodied as programming instructions stored on a non-transitory, machine-readable (e.g., computer/processor-readable) medium, such as memory/storage 134 shown in FIG. 1. In some examples, implementing the operations of methods 400, 500 and 600 can be achieved by a controller, such as a controller 110 of FIG. 1, reading and executing the programming instructions stored in a memory 134. In some examples, implementing the operations of methods 400, 500 and 600 can be achieved using an ASIC and/or other hardware components alone or in combination with programming instructions executable by a controller 110.

Figure 5A:
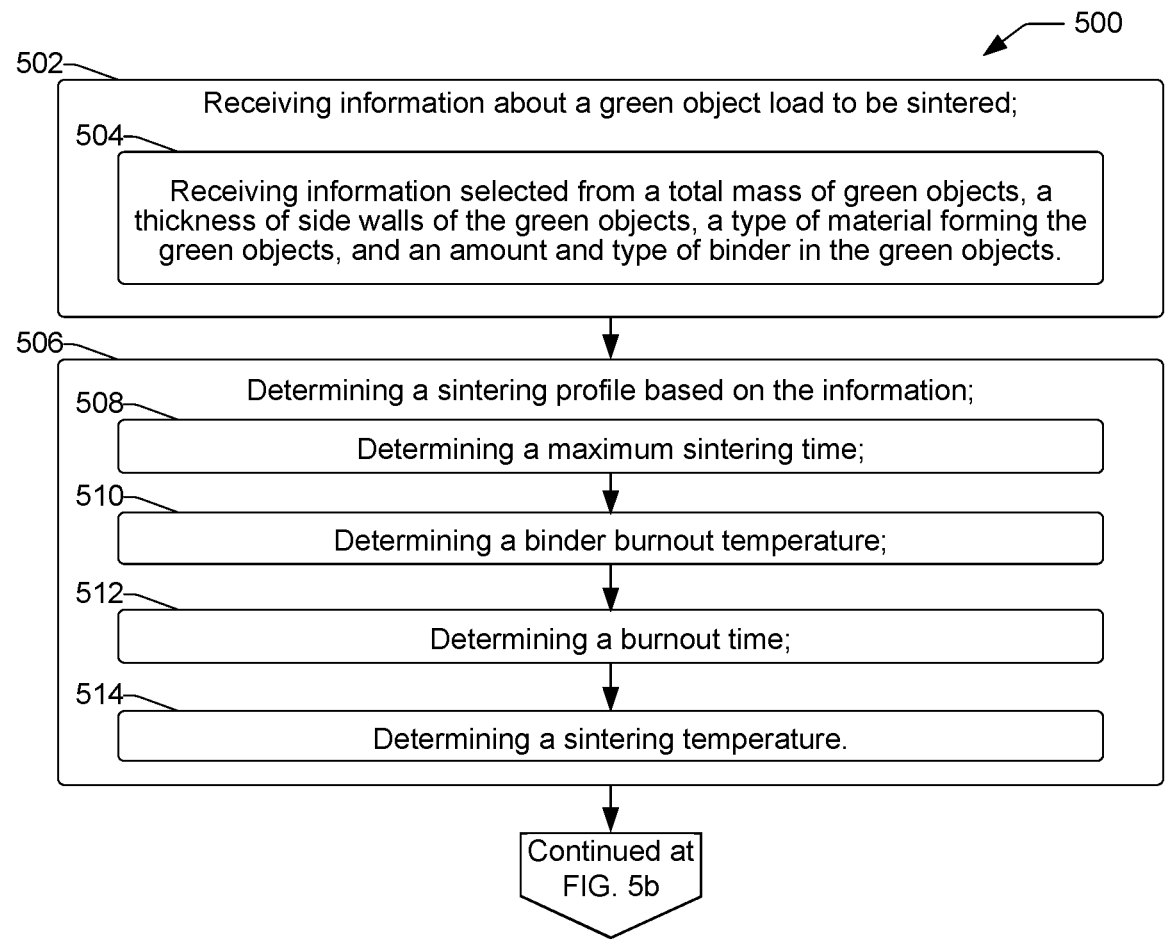
Figure 5B:
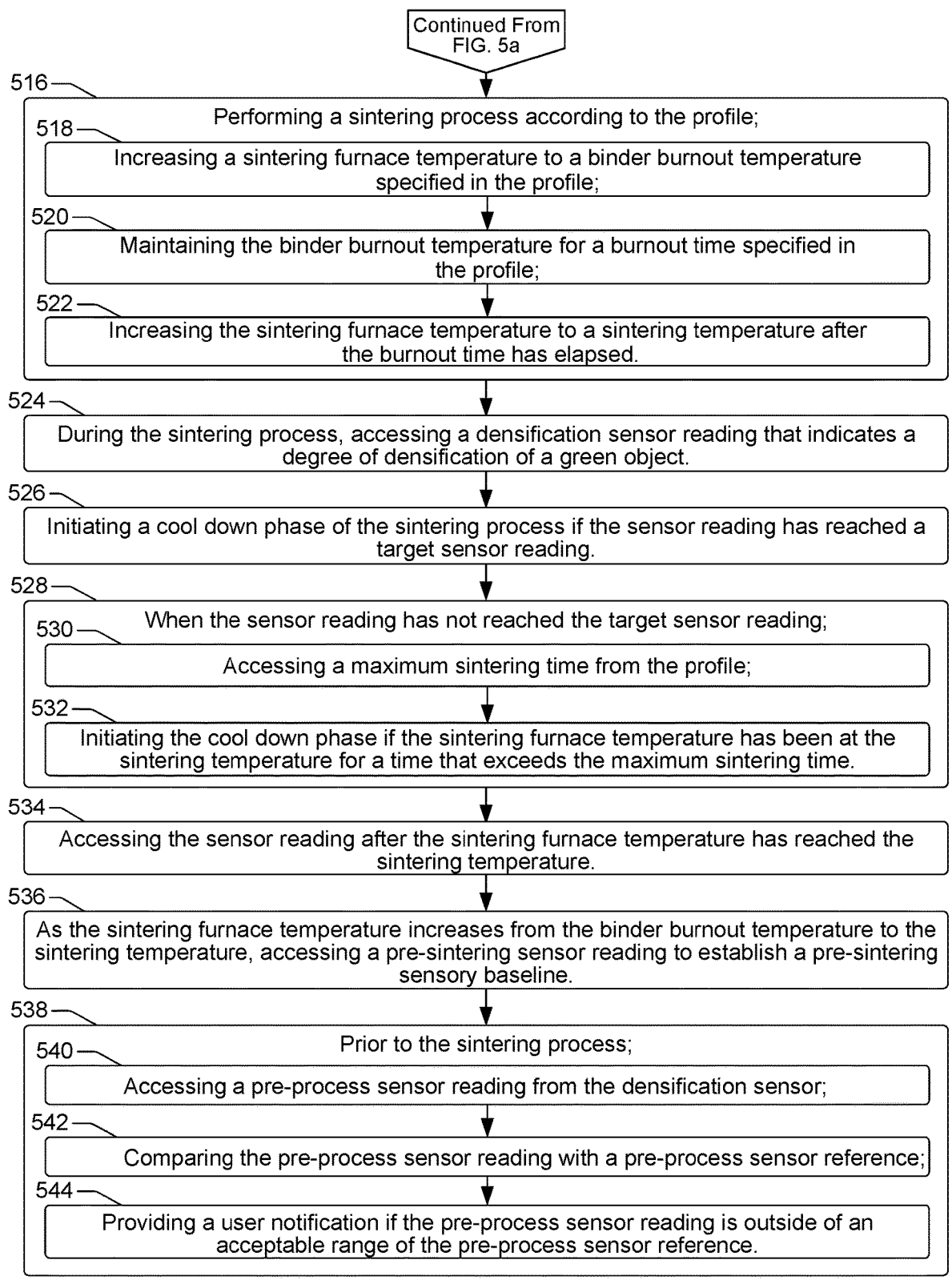
Figure 6:
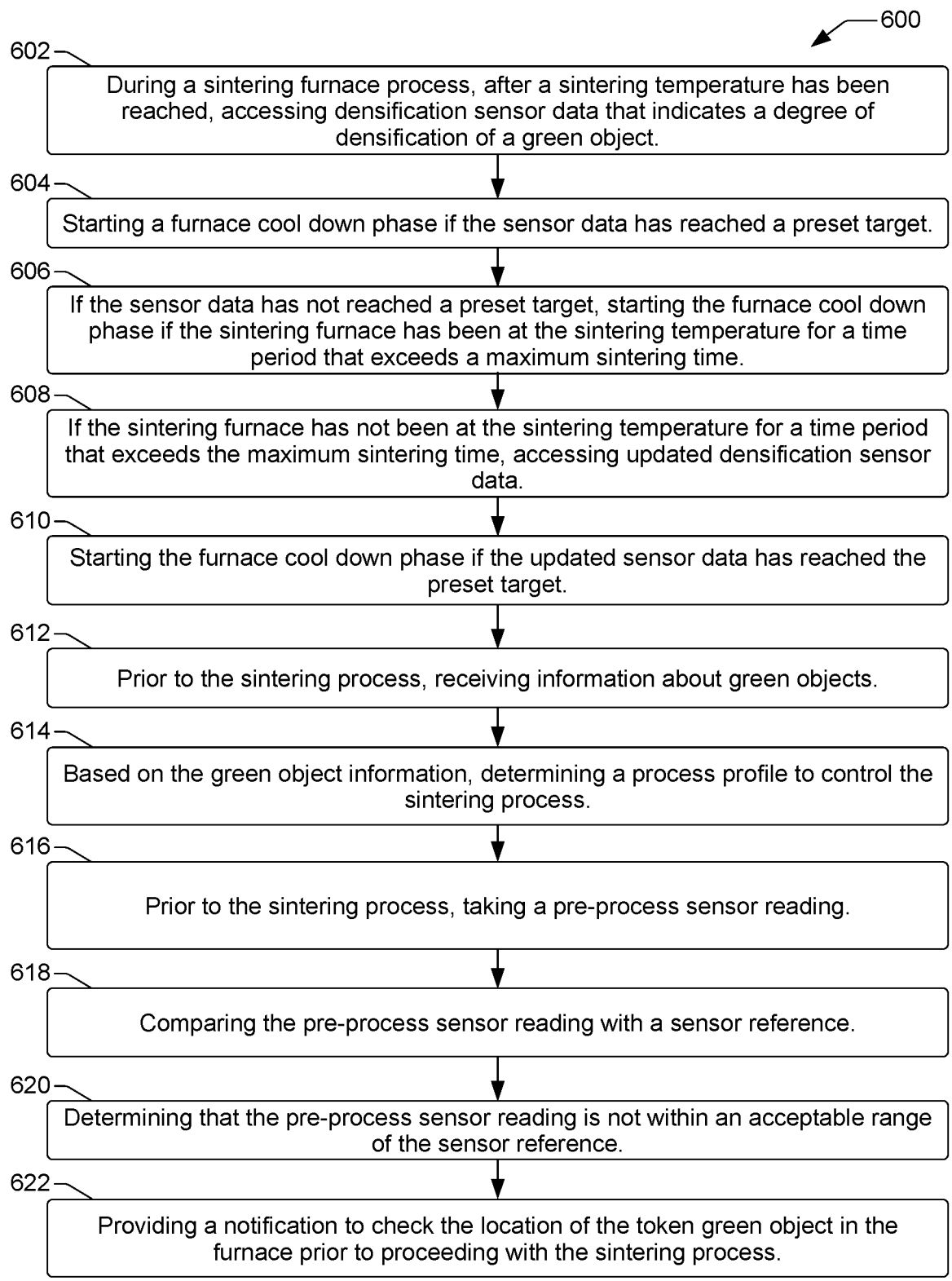

The methods 400, 500 and 600 may include more than one implementation, and different implementations of methods 400, 500 and 600 may not employ every operation presented in the respective flow diagrams of FIGS. 4, 5, and 6. Therefore, while the operations of methods 400, 500 and 600 are presented in a particular order within their respective flow diagrams, the order of their presentations is not intended to be a limitation as to the order in which the operations may actually be implemented, or as to whether all of the operations may be implemented. For example, one implementation of method 500 might be achieved through the performance of a number of initial operations, without performing other subsequent operations, while another implementation of method 500 might be achieved through the performance of all of the operations.

Referring now to the flow diagram of FIG. 4, an example method 400 of operating a sintering furnace can begin at block 402 with receiving information about a green object load to be sintered in a sintering furnace. The method can include determining a sintering profile based on the information, and performing a sintering process according to the sintering profile, as shown at blocks 404 and 406. During the sintering process, a sensor reading can be accessed from a densification sensor that indicates a degree of densification of a green object in the load, and a cool down phase of the sintering process can be initiated if the sensor reading has reached a target sensor reading.

Referring now to the flow diagrams of FIGS. 5a and 5b, an example method 500 of operating a sintering furnace can begin at block 502 with receiving information about a green object load to be sintered in a sintering furnace. In some examples, receiving information comprises receiving information selected from a total mass of green objects in the load, a thickness of side walls of the green objects in the load, a type of material forming the green objects in the load, and an amount and type of binder binding the material together in the green objects in the load, as shown at block 504. The method includes determining a sintering profile based on the information, as shown at block 506. Determining a sintering profile can include determining a maximum sintering time, determining a binder burnout temperature, determining a burnout time, and determining a sintering temperature, as shown at blocks 508, 510, 512, and 514, respectively.

The method 500 continues at FIG. 5b, block 516 with performing a sintering process according to the sintering profile. In some examples, performing a sintering process according to the sintering profile can include increasing a sintering furnace temperature to a binder burnout temperature specified in the sintering profile, maintaining the binder burnout temperature for a burnout time specified in the sintering profile, and increasing the sintering furnace temperature to a sintering temperature after the burnout time has elapsed, as shown at blocks 518, 520, and 522. During the sintering process a sensor reading can be accessed from a densification sensor that indicates a degree of densification of a green object in the load as shown at block 524, and a cool down phase of the sintering process can be initiated if the sensor reading has reached a target sensor reading, as shown at block 526. If the sensor reading has not reached the target sensor reading (block 528), a maximum sintering time can be accessed from the sintering profile, and the cool down phase can then be initiated if the sintering furnace temperature has been maintained at the sintering temperature for a time that exceeds the maximum sintering time, as shown at blocks 530 and 532.

Accessing the sensor reading can include accessing the sensor reading after the sintering furnace temperature has reached the sintering temperature as shown at block 534. The method can also include accessing a pre-sintering sensor reading from the densification sensor to establish a pre-sintering sensory baseline during the time that the sintering furnace temperature is increasing from the binder burnout temperature to the sintering temperature, as shown at block 536. In some examples, prior to performing the sintering process (block 538), a pre-process sensor reading can be accessed from the densification sensor (block 540) and compared with a pre-process sensor reference (block 542). A user notification can be provided if the pre-process sensor reading is outside of an acceptable range of the pre-process sensor reference, as shown at block 544.

Referring now to the flow diagram of FIG. 6, an example method 600 of operating a sintering furnace can begin at block 602. During a sintering process to sinter green objects in a sintering furnace, and after the sintering furnace has reached a sintering temperature, sensor data that indicates a degree of densification of a token green object is accessed from a densification sensor. The method includes starting a furnace cool down phase if the sensor data has reached a preset target (block 604), and if the sensor data has not reached a preset target, starting the furnace cool down phase if the sintering furnace has been at the sintering temperature for a time period that exceeds a maximum sintering time (block 606). Furthermore, if the sintering furnace has not been at the sintering temperature for a time period that exceeds the maximum sintering time, updated sensor data is accessed from the densification sensor (block 608), and the furnace cool down phase is started if the updated sensor data has reached the preset target (block 610). Prior to the sintering process, information about the green objects is received (block 612), an based on the green object information, a process profile to control the sintering process is determined (block 614). In some examples, prior to the sintering process, a pre-process sensor reading is taken (block 616) and compared with a sensor reference (block 618). The method can include determining that the pre-process sensor reading is not within an acceptable range of the sensor reference (block 620), and providing a notification to check the location of the token green object in the furnace prior to proceeding with the sintering process (block 622).

What is claimed is:

1. A method of operating a sintering furnace comprising:
   receiving information about a green object load to be sintered in a sintering furnace;
   determining a sintering profile based on the information;
   performing a sintering process according to the sintering profile;
   during the sintering process, accessing a sensor reading from a densification sensor that indicates a degree of densification of a green object in the load; and,
   initiating a cool down phase of the sintering process if the sensor reading has reached a target sensor reading.

2. A method as in claim 1, wherein performing a sintering process according to the sintering profile comprises:
   increasing a sintering furnace temperature to a binder burnout temperature specified in the sintering profile;
   maintaining the binder burnout temperature for a burnout time specified in the sintering profile; and,
   increasing the sintering furnace temperature to a sintering temperature after the burnout time has elapsed.

3. A method as in claim 2, further comprising:
   when the sensor reading has not reached the target sensor reading, accessing a maximum sintering time from the sintering profile; and,
   initiating the cool down phase if the sintering furnace temperature has been at the sintering temperature for a time that exceeds the maximum sintering time.

4. A method as in claim 2, comprising accessing the sensor reading after the sintering furnace temperature has reached the sintering temperature.

5. A method as in claim 2, further comprising:
   as the sintering furnace temperature increases from the binder burnout temperature to the sintering temperature, accessing a pre-sintering sensor reading from the densification sensor to establish a pre-sintering sensory baseline.

6. A method as in claim 1, further comprising:
   prior to performing the sintering process, accessing a pre-process sensor reading from the densification sensor;
   comparing the pre-process sensor reading with a pre-process sensor reference; and,
   providing a user notification if the pre-process sensor reading is outside of an acceptable range of the pre-process sensor reference.

7. A method as in claim 1, wherein receiving information about the green object load comprises receiving information selected from a total mass of green objects in the load, a thickness of side walls of the green objects in the load, a type of material forming the green objects in the load, and an amount and type of binder binding the material together in the green objects in the load.

8. A method as in claim 1, wherein determining a sintering profile comprises:
   determining a maximum sintering time;
   determining a binder burnout temperature;
   determining a burnout time; and,
   determining a sintering temperature.

9. A sintering system for operating a sintering furnace, comprising:
   a sintering furnace to sinter a load of green objects;
   a densification sensor to provide a sensor reading that indicates a degree of densification of a token green object being sintered in the sintering furnace; and,
   a controller to compare the sensor reading with a target sensor value and to initiate a furnace cool down phase when the sensor reading reaches the target sensor value.

10. A sintering system as in claim 9, wherein the densification sensor comprises a sensor selected from an optical sensor, an electrical sensor, and a gas sensor.

11. A sintering system as in claim 9, wherein the densification sensor location is selected from a location outside of the sintering furnace, a location inside of the sintering furnace, and a location both outside and inside the sintering furnace.

12. A method of operating a sintering furnace comprising:
   during a sintering process to sinter green objects in a sintering furnace, and after the sintering furnace has reached a sintering temperature, accessing sensor data from a densification sensor that indicates a degree of densification of a token green object;
   starting a furnace cool down phase if the sensor data has reached a preset target; and,
   if the sensor data has not reached a preset target, starting the furnace cool down phase if the sintering furnace has been at the sintering temperature for a time period that exceeds a maximum sintering time.

13. A method as in claim 12, further comprising:
   if the sintering furnace has not been at the sintering temperature for a time period that exceeds the maximum sintering time, accessing updated sensor data from the densification sensor; and,
   starting the furnace cool down phase if the updated sensor data has reached the preset target.

14. A method as in claim 12, further comprising:
   prior to the sintering process, receiving information about the green objects; and,
   based on the green object information, determining a process profile to control the sintering process.

15. A method as in claim 12, further comprising:
   prior to the sintering process, taking a pre-process sensor reading;
   comparing the pre-process sensor reading with a sensor reference;
   determining that the pre-process sensor reading is not within an acceptable range of the sensor reference; and,
   providing a notification to check the location of the token green object in the furnace prior to proceeding with the sintering process.

* * * * *